June 21, 1949.    G. H. LELAND    2,473,598
FABRICATED ROTARY SOLENOID
Filed Dec. 3, 1945

INVENTOR
GEORGE H. LELAND
BY
ATTORNEY

Patented June 21, 1949

2,473,598

UNITED STATES PATENT OFFICE 2,473,598

FABRICATED ROTARY SOLENOID

George H. Leland, Dayton, Ohio

Application December 3, 1945, Serial No. 632,530

1 Claim. (Cl. 175—336)

1

This invention relates to a solenoid and more particularly to a rotary solenoid of the general type shown and described in my application Serial No. 542,188, filed June 26, 1944.

One object of the invention is to facilitate the construction of such a solenoid and to reduce the cost of the same.

A further object of the invention is to provide such a solenoid in which a substantial portion of the elements are formed of sheet metal.

A further object of the invention is to provide such a solenoid in which the stationary core and the armature are each formed of a plurality of laminations.

Other objects of the invention may appear as the apparatus is described in detail.

Figure 1:
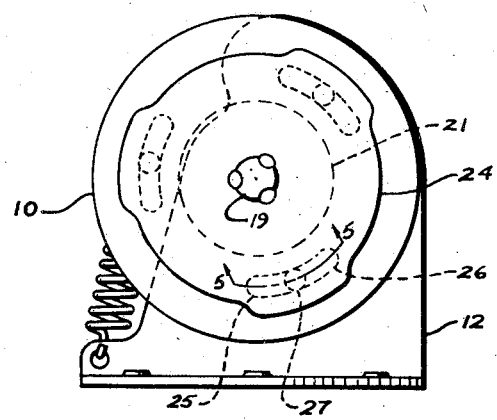
Figure 2:
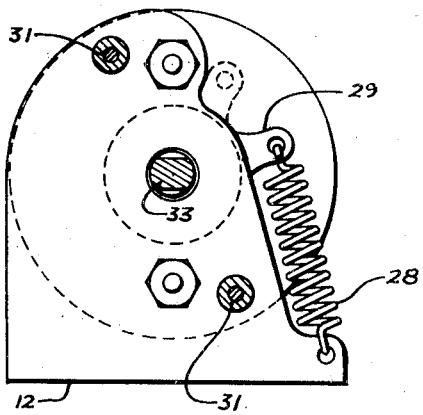
Figure 4:
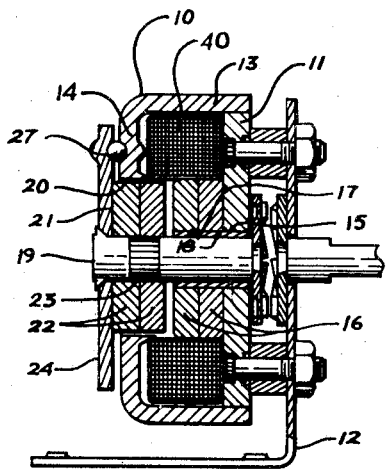
Figure 3:
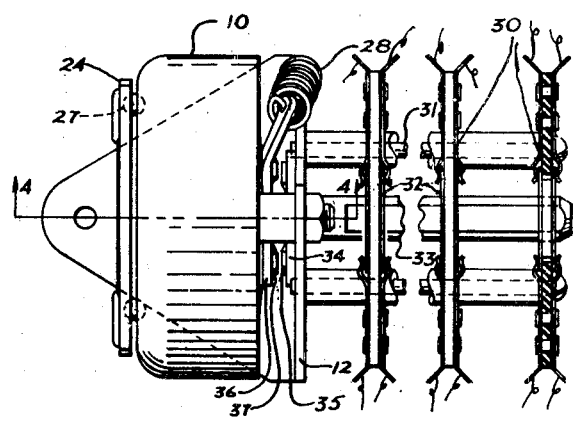
Figure 5:
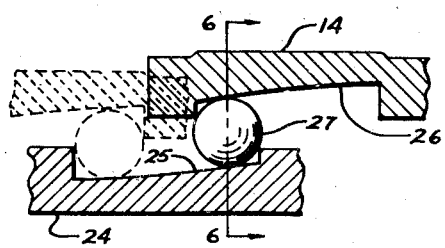
Figure 6:
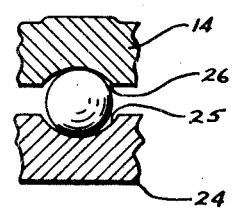

In the accompanying drawings, Fig. 1 is an elevation of one end of an apparatus embodying the invention; Fig. 2 is an elevation of the opposite end of that apparatus, partly in section; Fig. 3 is a top plan view of the apparatus, partly broken away; Fig. 4 is a section taken on the line 4—4 of Fig. 3; Fig. 5 is a section taken on the line 5—5 of Fig. 1; and Fig. 6 is a section taken on the line 6—6 of Fig. 5.

In these drawings I have illustrated a preferred embodiment of the invention but it is to be understood that the device as a whole, as well as the several parts thereof, may take various forms and may be assembled in various ways without departing from the spirit of the invention.

In the particular embodiment here illustrated, the solenoid comprises a casing which is preferably cylindrical in form and includes a cup-shaped structure 10 and a back wall or closure 11 for the open end of that structure. The casing may be supported in any suitable manner and in the present instance the back wall 11 is rigidly secured to one arm of an angular bracket 12, the other arm of which is adapted to be secured to a supporting structure. The peripheral wall 13 and the front end wall 14 of the cup-shaped structure 10 are preferably integral and the structure may be formed of sheet metal by punching and forming operations.

The core of the solenoid comprises a plurality of laminations of magnetizable metal, usually iron, rigidly supported in face to face contact one with the other. In the present arrangement the back wall 11 constitutes, in effect, a part of the core and it comprises one or more laminations so arranged with relation to the other laminations as to form a unitary structure. In this form the back wall 11 comprises a disk of metal which extends into and is rigidly secured in the open end

2 of the cup-shaped structure 10 and is provided with an axial aperture 15. The inner laminations comprise two disks 16 of metal, which are also provided with axial apertures 17, and are arranged in face to face contact one with the other and with the back wall 11. While the core structure is here shown as comprising three disks of the same thickness it will be understood that it may include any suitable number of laminations of the same or different thickness. The contacting surfaces of the laminations should be smooth and in truly parallel planes in order to secure the highest efficiency. They may be supported in fixed contacting positions in various ways but preferably they are tightly pressed on a sleeve 18.

The sleeve 18 constitutes a bearing in which a shaft 19 is mounted for both rotary movement and axial movement, the forward end of the shaft extending through an opening 20 in the front wall 14 of the casing. Rigidly secured to the shaft 19 is a laminated armature 21 which, as here shown, is supported in the opening in the front wall and comprises two disks 22 of metal, having axial apertures to receive the shaft. The armature disks are preferably pressed tightly on the shaft, which may, if desired, be provided with a knurled surface to positively lock the shaft and armature against relative rotation.

The core disks 16 and the armature disks 22 are of a diameter less than the inside diameter of the casing, thus providing an annular space to receive an energizing element or coil 40, which extends about the adjacent portions of the core and the armature.

A plate 24 is rigidly connected with the shaft 19 exteriorly of the casing and is preferably provided with an aperture by means of which it may be pressed onto the shaft and into contact with the outermost disk of the armature, and then staked to lock the plate and armature on the shaft. The armature extends forwardly beyond the front wall of the casing and the outer portion of the plate, which extends radially beyond the opening 20, is thus spaced from the front wall of the casing. The plate and the front wall are provided with a plurality of pairs of opposed arcuate grooves 25 and 26, the bottom walls of which slope in opposite directions and a ball 27 is supported in each pair of grooves. A spring 28, which is connected with an arm 29 on the shaft and with the bracket 12, retains the plate normally in a position in which the shallow ends of the grooves of each pair are adjacent one another and the ball is confined in said shallow ends. Upon the energization of the coil 40 the magnetic flux moves the armature and the plate axially toward the core and the pressure thus exerted on the balls 27 by the sloping surfaces of the grooves 26 in the plate causes the latter to ride over the balls and causes the balls to move down the sloping surfaces of the grooves 26 in the front wall until the balls are positioned in the deep ends of the grooves of the respective pairs, thereby causing the plate, armature and shaft to rotate against the action of the spring a distance determined by the length of the grooves. When the coil is de-energized the spring returns the parts to their normal positions.

The rotary movement of the armature may be utilized in various ways for various purposes and in the illustrated device both the axial movement and the rotary movement are used to actuate a switch mechanism. The switch mechanism comprises fixed contact members 30 mounted on rods 31, which are carried by the bracket 12, and movable contact members 32 carried by a shaft 33 rotatably mounted in the bracket in alinement with the shaft 19 of the solenoid. A disk 34 secured to the shaft 33 on the inner side of the bracket is provided on its inner side with ratchet teeth 35. A similar disk 36 is mounted on the rear end of the solenoid shaft 19 and is provided with ratchet teeth 37 opposed to and normally spaced from the ratchet teeth 35. When the solenoid is energized the initial axial movement of the shaft 19 moves the teeth 37 in engagement with the teeth 35 and the rotation of the shaft 19 is transmitted to the switch shaft 33 to actuate the movable switch elements. When the solenoid is de-energized the spring 28 causes the ratchet teeth 37 to ride over the teeth 35 in the reverse direction, thus restoring the solenoid to its initial position without imparting movement to switch.

It will be apparent, therefore, that the major portion of the elements of the solenoid may be formed of sheet metal and quickly and easily assembled with remaining elements, thus speeding up production and reducing production costs without imparing the efficiency of durability of the solenoid.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

In a rotary solenoid, a casing comprising a circumferential wall, a front wall rigid with said circumferential wall, and a rear wall having a pressed fit in said circumferential wall and having an axial opening, a sleeve mounted in and having a pressed fit in the opening in said rear wall, disks mounted on said sleeve and having a pressed fit thereon, said disks and said rear wall constituting a core, a shaft rotatably mounted in said sleeve and extending forwardly beyond the same, an armature comprising disks mounted on and having a pressed fit on said shaft, a plate rigidly mounted on said shaft in opposed relation to said front wall, a magnetizing coil mounted in said casing about said core to energize the latter and impart axial movement to said armature, means interposed between said plate and said front wall and controlled by the axial movement of said plate by said armature to impart rotary movement to said armature, and means for rotating said shaft and said armature in a reverse direction when said core is deenergized.

GEORGE H. LELAND.

REFERENCES CITED

The following references are of record in the file of this patent:

UNITED STATES PATENTS

| Number | Name | Date |
|---|---|---|
| 753,879 | Gregory | Mar. 8, 1904 |
| 1,504,227 | Gent | Aug. 12, 1924 |
| 1,533,770 | Shaw | Apr. 14, 1925 |
| 1,866,529 | Farkas | July 12, 1932 |
| 2,055,376 | Critchfield | Sept. 22, 1936 |
| 2,055,511 | Twiss | Sept. 29, 1936 |
| 2,190,650 | Carew et al. | Feb. 20, 1940 |
| 2,227,328 | Steiss | Dec. 31, 1940 |

FOREIGN PATENTS

| Number | Country | Date |
|---|---|---|
| 659,975 | Germany | May 14, 1938 |